March 2, 1943.  R. A. STEPS  2,312,600
WELL MECHANISM
Filed Jan. 2, 1941
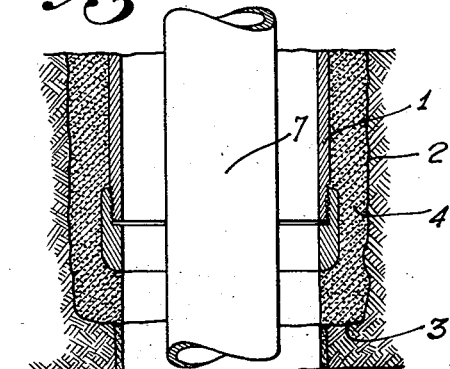
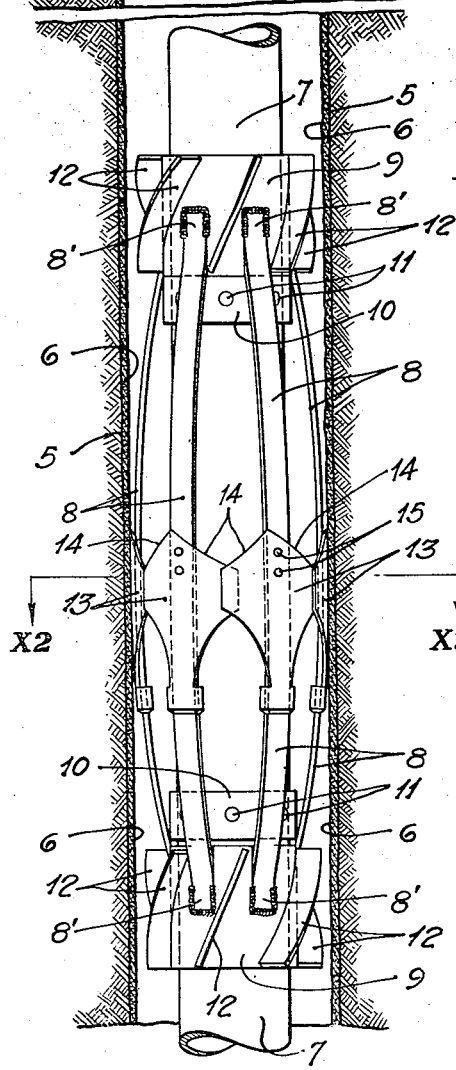
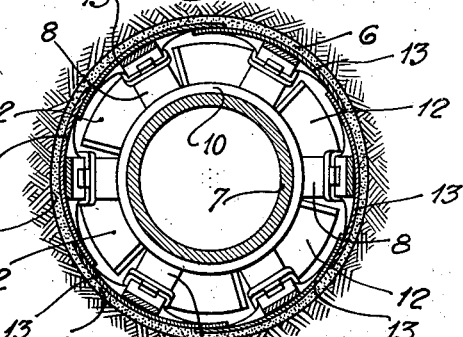
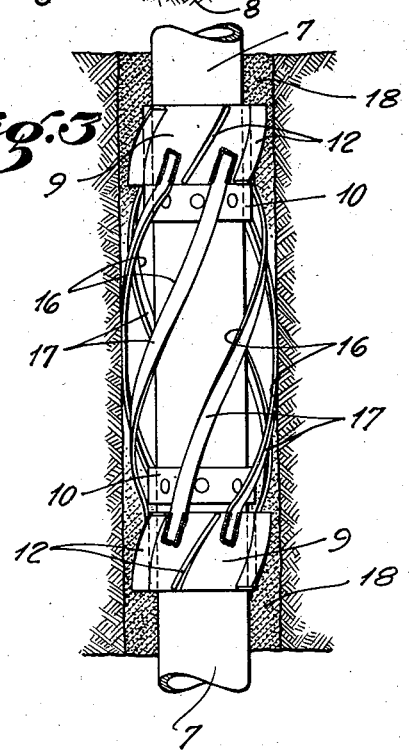
INVENTOR.
Robert Alexander Steps Patented Mar. 2, 1943

2,312,600

UNITED STATES PATENT OFFICE 2,312,600

WELL MECHANISM

Robert Alexander Steps, Los Angeles, Calif.

Application January 2, 1941, Serial No. 372,788

3 Claims. (Cl. 166—4)

This invention relates to mechanism used in connection with cement jobs for deep wells.

In drilling wells for oil, gas, water or other substances, it is common practice to drill the hole to a considerable depth; to then lower therein the pipe which is to comprise the well casing, this pipe being of smaller outside diameter than the bore of the drilled hole; and to then introduce cement in slurry form down through this pipe, forcing it to issue from the lower end thereof and to rise through a considerable height outside the pipe to fill the space between the bore of the hole and the pipe. In a typical job of this sort the cement may rise and surround the pipe for several hundred feet above the lower end of the pipe, the pipe itself extending perhaps several thousand feet further up to the surface of the earth. When the cement finally sets in position around the pipe it forms a plug which is intended to completely fill the space between the pipe and the drilled hole throughout the zone covered by the plug. The purpose of this plug is to seal off undesirable water or other liquids or gas produced in strata at or above the plug and to prevent these from leaking downwardly past the plug to contaminate the oil or other desired material to be produced from the well at points below this cement plug.

During the above described cementing operation, and while the cement is being forced upwardly around the outside of the pipe, it rises against the drilling mud which fills the hole at that time. In fact, the cement slurry displaces this drilling mud by pushing it upwardly ahead of it, but because the specific gravities of the cement slurry and the drilling mud are not very different, and because of other conditions, the cement does not always rise uniformly in the space around the pipe to make a clean line of demarcation between the cement below and the drilling mud above it, but instead the cement sometimes channels upwardly through the drilling mud on one side of the pipe only, and forms what might be called a cement chimney or channel for a considerable distance upward along the pipe, the part of the hole not occupied by this cement chimney remaining filled only with the drilling mud. In these cases the cement finally sets in this channeled or chimney form, and this obviously produces a defective cement job in that the sealing power of the plug is impaired. Cement work in deep wells is expensive, and therefore such failure of the plug may represent substantial financial loss.

It is an object of this invention to prevent such channeling of the cement upwardly along one side of the pipe only, and to insure thorough diffusion of the cement all around the pipe especially in combination with means for centering the pipe in the hole to thereby produce the ideal result of a thoroughly homogeneous unchanneled cement plug in which the pipe is accurately centered to give uniform strength and sealing power all around the pipe.

Another object of my invention relates to the washing of the well hole preparatory to cementing and has for its purpose to provide a vigorous whirling washing action that forcibly impinges against the mud cake then on the wall of the drilled hole to aid in removing this mud cake from the wall in order that the cement to be subsequently introduced may make a perfect bond with the virgin formation that comprises the true wall of the well hole. This vigorous whirling washing action cooperates uniquely with the scrapers or other positive means that may be used to remove the mud cake from the wall of the hole, as will be more fully described later in this specification.

Other objects and features of this invention will become apparent through consideration of the following description, also the appended drawing and the claims.

In the accompanying drawing like parts are designated by like reference numerals.

Fig. 1 is a vertical section through the well hole showing one preferred form of my invention in position therein.

Fig. 2 is an enlarged transverse section through the well taken on line $X^2$—$X^2$ of Fig. 1, looking in the direction of the arrows.

Fig. 3 illustrates one of many alternative or modified forms of my invention.

Near the top of Fig. 1 there is shown the lower end of an upper stand of well pipe or casing 1 set into the well hole or bore 2 which was drilled at the diameter shown to a depth 3, and between the outside of pipe 1 and the well wall 2 is shown a thoroughly centered cement plug 4. This plug as already indicated may extend upward from the bottom of pipe 1 for a considerable distance, say several hundred feet, but it usually does not extend up over the entire height of pipe 1 as the latter may be several thousand feet high to the surface of the earth.

In Fig. 1 the drilling of the well is shown as continued below depth 3 at a reduced diameter shown at 5, and on the inside of this well bore 5 is indicated a layer of mud cake 6 which sometimes forms on the wall of the well during drilling in ways that are well understood by those skilled in this art. Where such mud cake exists it is desirable to remove it prior to cementing in order that good direct bond can be effected between the cement and the formation comprising the true wall of the well. Or, if the hole is not to be cemented at the place in question, but instead the desired oil or other material is to be produced from the zone or strata at that place, then it is desirable to remove such mud cake 6 from such zone or strata to facilitate the production of the oil or other material therefrom.

In Fig. 1 there is shown lowered into this well bore 5 another stand of pipe or casing 7, of smaller diameter than the upper pipe 1, and on this pipe 7 is shown one form of the mechanism comprising my invention.

To facilitate the following description it will be presumed that my invention is here used in connection with a cementing job, rather than in connection with a centering or mud removing job at the oil or other producing strata.

In connection with such cementing job it will be understood that pipe 7 like pipe 1, may as already indicated be several thousand feet in height, and that the cement plug to be formed around the lower portion of this pipe will usually extend upwardly several hundred feet from the bottom end thereof, in a typical case. It will also be understood that the mechanism comprising my invention may be duplicated, and in fact is preferably duplicated, at several places suitably spaced apart from each other and distributed along that entire portion of pipe 7 where the cement plug is to be formed so that this plug will as nearly as possible be perfect along its entire height.

Since during cementing, the pipe 7 which is supported at the surface of the earth, may be hanging downwardly through several thousand feet of any well hole 5, and since well holes are seldom if ever drilled absolutely straight, it is obvious that pipe 7 may lean toward the wall of the well bore 5, and may even contact this wall, at various places throughout the depth of the hole including of course the portion where the cement plug is to be formed. If the plug were formed and set without correcting this eccentricity of the pipe in the hole, the plug would probably be unsatisfactory, since there would be no cement between the pipe and the well wall at the side where the pipe contacts the hole, and there would be an excessive amount of cement at the other side. Therefore, I provide as an element of my mechanism a plurality of radially expansible and contractable centering members of any desired form or kind whatever, adapted to contact the walls of the well to centralize, or to tend to centralize, the pipe in the hole. In the broadest view of my invention the form and character of these radially expansible and contractable centering members can vary over a wide range, but in my present preferred form, as illustrated in Fig. 1, these centering members consist of outwardly bowed springs 8 which have their ends 8' fastened by welding or otherwise into two spaced end collars 9. The springs 8 in addition to being radially expandable and contractable, are also flexible, it being this flexibility which in this particular form of the invention accounts for these centering members being radially expansible and contractable, but this latter feature or quality can be procured or arranged in other ways. The end collars 9 embrace pipe 7 and are preferably free thereon, although they may be held or limited to some definite position on the pipe in various ways. In Fig. 1 these collars 9 are limited as to endwise movement on the pipe by the stop rings 10, two of these being preferably used, one near each end collar 9, and these stop rings 10 are welded to pipe 7 at points 11 in these rings. These stop rings are adapted to abut against their respective adjacent end collars 9 to thus limit the position of the mechanism on the pipe. The stop rings 10 are spaced from each other in such manner as to permit the outwardly bowed springs 8 when not restrained in the hole, to expand to their full maximum natural or free bowed shape, which is greater than the bore of well hole 5, so that springs 8, when in the hole 5, will always press against the walls thereof to thereby tend to center the pipe in the hole. However, in passing downwardly through hole 5, as irregularities and restrictions in the diameter of the hole are encountered, the radial expandability and contractability of springs 8 will permit the device to freely pass through such irregularities, and accommodate themselves thereto, both during an upward or downward movement of the device through the well hole.

The purpose of centering the pipe in the hole is, as previously explained, to center it in the center plug which is to be formed around it, but even this centering of the pipe in the plug is not enough to insure an ideal and successful plug because of the possibility that the cement may rise in channel or chimney form on one side of the pipe only, and as previously explained this would result in a defective job even though the pipe were correctly centered in the hole.

Therefore, in order to assure a more perfect job, I provide in close association and operative combination with the radially expansible and contractable centering means already described, an efficient set of cement diffusing baffles, blades or vanes, which may be variously arranged as to details, to interrupt any channeling action of the rising cement and by giving to the cement a whirling or rotating motion or tendency around the pipe, to thus efficiently diffuse the cement and break up the aforesaid channels, to finally produce the ideal result of a cement plug thoroughly diffused and unchanneled around the pipe with the latter correctly centered in such plug. By duplicating my apparatus at suitable places along the pipe as already recommended, this action of diffusing the cement and centering the pipe is repeated again and again along the entire height of the cement plug to make the latter ideal in character throughout its entire height.

In the preferred form of my device as illustrated in the drawing, I show as a means of providing this cement diffusion, the spirally formed vanes 12, these being here illustrated as formed on the end collars 9 of the device. These vanes are preferably duplicated both on the upper and lower collar 9, although a fair result could be procured by providing them only on one or the other of these collars. If the rising cement should be in channel form, these spiral vanes 12 will successfully interrupt this channel and by whirling the cement around the pipe, first at the bottom collar 9 and again at the upper collar 9, will successfully diffuse the cement around the pipe and destroy the channel so that the resulting plug will in obvious manner be thoroughly homogeneous around the pipe at the place where the centralizing members 8 are located, so that the resulting plug will be of uniform thickness and homogeneous all around the pipe in ideal fashion, especially in the vicinity where my device is located.

I might further explain at this point that these spiral vanes 12 have another beneficial result in connection with washing the mud cake 6 off the wall of the hole during the washing of the well which commonly precedes the introduction of the cement. This washing consists in forcing down through pipe 7 thinner mud than that which is normally used during drilling, and this thinner mud, which is sometimes so thin as to be almost clear water, rises from the bottom of pipe 7 and flows upwardly through the well in the space outside the pipe, or in other words in the space to be later occupied by the cement. This flow or circulation of the lighter mud is induced by very powerful pumps attached to pipe 7 at the surface of the earth, and consequently the velocity of the lighter mud upwardly around the outside of pipe 7 is considerable. The purpose of this circulation is to wash out the hole, and if possible to reduce or wash away the mud cake 6 from the wall of the hole preparatory to cementing, and in order to produce these results this washing continues for considerable time. But obviously, the mere upward flow of the fluid along the outside of pipe 7 is not in itself a very forceful scouring action against the mud cake 6 even though the velocity of flow is appreciable. The introduction of my spiral vanes 12, however, by inducing the rising wash fluid to whirl vigorously around the hole at the places where these vanes are located, causes the washing fluids to impinge vigorously against the mud cake 6 and the effect in removing the mud cake is thus considerably increased above the effect realized merely by vertical movement of the fluid. The centering action of members 8 in the vincinity of the vanes 12, by tending to hold the latter in the center of the hole, also cooperates in improving the whirling washing action just referred to and in increasing the efficiency thereof.

The beneficial results mentioned in the two paragraphs just preceding, to-wit, the production of the ideal homogeneous well-centered and unchanneled cement plug, and also the improved washing action which tends more efficiently to remove the mud cake preparatory to cementing, are procured essentially through the combinative action of only so much of my device as has thus far been described by me, namely the radially expansible and contractable centering members and the baffles, blades or vanes of whatever form desired, arranged in reasonably close proximity to the centering members.

However, as another feature of my invention I prefer that the radially expansible and contractable members should have thereon some form of positive mud scraping edges, or some form of positively acting elements or expedients for scraping, scratching away or otherwise removing the mud cake 6 from the well bore when the pipe 7 is moved up and down through the well hole with these devices thereon. These positive mud removing expedients can be of various forms. In the preferred type of my mechanism illustrated in Fig. 1 I have shown the same as comprising mud scraping blades 13, the upper edges 14 of which positively cut or scrape the mud cake 6 from the walls of the hole when the device is pulled upwardly by moving pipe 7 up through the hole, but when pipe 7 is lowered through the hole these blades 13 will not scrape off the mud but will slide over it owing to their shape as shown in Fig. 1. In effect these blades 13, if used, are considered a part of the springs 8, this being so irrespective of whether these blades are formed of the spring material itself as an integral part of the spring, or whether they are separate parts attached to the springs by welding or by rivets 15, see Fig. 1. In Fig. 3 where the springs are shown as twisted or spiralled as well as being bowed outwardly in diameter, the forward edges 16 of these centering springs 17 comprise the mud scraping edges which serve to remove the mud cake from the wall when the pipe is raised. With such mud removing or scraping edges, or other positively acting mud removing elements, combined with the balance of the mechanism previously described, it is apparent that the cleaning of the hole preparatory to cementing, and the removal of all the mud cake therefrom in the vicinity where the cementing is to occur, is insured with maximum predictable success. The spiral vanes 12, or equivalent baffles or blades as may be substituted, have the following unique coaction with the mud removing edges 14 or 16, or other mud removing expedients used in association with the vanes 12, or their equivalent. It will be understood that when such positive mud removing elements are used, the pipe 7 will be continuously raised and lowered through the hole during the period when the above described washing of the hole is proceeding, the purpose of such motion of the pipe being to positively scrape the mud cake 6 from the well walls by means of the elements supplied for this purpose. My mechanism then works as follows. As it rises slowly with the pipe the upper vanes 12 will vigorously whirl the washing liquid against the mud cake, thus at least loosening the same even if it does not remove it. Thus the mud cake might be said to be conditioned for more easy removal from the well wall by means of the scraping edges that follow immediately after the vanes 12, and because of this conditioning due to vanes 12 the mud cake is more easily removed by the positive mud removing members than might be if the latter acted alone. Likewise, after these mud removing members have passed upwardly to perform their mud removing function, it is possible and probable that some parts or streaks of mud may still adhere to the well wall, and as a means of removing these the whirling washing action induced by the lower set of spiral vanes 12 following immediately after the mud removing members has an important influence in finally scouring the well wall to remove any such remaining streaks or particles of mud which may not have been removed by the positive action of the mud removing edges or elements. Again during the downward travel of the pipe and mechanism, preparatory to the next upward stroke, this whirling washing action induced against the well bore both by the upper and lower series of blades 12 continues effectively to remove the mud from the wall, and in all these ways, remembering that the raising and lowering of the pipe and mechanism is repeated several times, it is apparent that the hole will be completely cleaned and freed from mud cake so that when the thoroughly diffused unchanneled and centralized cement plug is finally set it will have perfect and direct bond with the virgin earth formation and will give maximum assurance that the plug will be a successful and tight seal for the purposes for which it is intended.

In Fig. 3 the hole is shown after the mud cake has been removed from the walls thereof, and a portion of the final cement plug is shown in the hole at 18. It will be understood that the cement plug completely surrounds and embeds the device but it has not been so shown in Fig. 3 in order to simplify and clarify the illustration of the mechanism itself. Fig. 1 shows the condition of the hole just after the pipe and mechanism has been lowered into it and before the mud cake is removed or the cement introduced.

From the foregoing description of the construction and operation of my mechanism it is thought that my invention will be fully understood by those skilled in the art. The principal point is that the centering springs 16, and also springs 8, irrespective of whether the latter are equipped with mud scraping blades 13 or not, bear against the wall of the well to center the pipe therein in close positional relation to the spirally arranged baffle means which induces the fluid to flow around the pipe, so that these parts cooperate with each other to produce an unchanneled cement plug extending all around the pipe, with the pipe centered therein.

In conclusion I wish to state that in this specification and in the drawing I have described and shown only my present preferred form of this invention, together with a single modification thereof, but I do not limit myself to these forms, and I wish to point out that extensive changes and adaptations can be made without departing from the spirit or essence of my invention which is limited only by the terms of the appended claims.

The subject matter of invention relating to the scraping blades, members or parts 13, shown but not claimed in this application, is claimed and covered in United States Patent No. 2,290,429 issued and granted on July 21, 1942, to myself and William Walter Hartman as joint inventors.

In this application either of the two collars 9 is to be considered as covered separately by the term "collar means," while both of these collars 9 are also to be considered as covered collectively by this same term "collar means." Also, although I prefer to provide the spirally extending vane means 12 on both collars 9, nevertheless it is obvious from the foregoing description that these vanes 12 may be provided on only one of these collars, and may be omitted from the other without departing from my invention.

I claim:

1. Well mechanism for pipe to be cemented in a well, said mechanism comprising in combination, spaced collar means adapted to fit on and embrace the pipe, a plurality of outwardly bowed springs secured to said collar means and adapted to bear against the wall of the well to center the pipe therein, and spirally extending vane means projecting externally from said collar means for flowing cement slurry around the pipe as it rises past said vane means, whereby the combined action of the centering springs and said spirally extending vane means cooperate to produce an unchanneled cement plug extending all around the pipe with the pipe approximately centered therein.

2. Well mechanism for pipe to be cemented in a well, said mechanism comprising in combination spaced collar means adapted to fit on and embrace the pipe, a plurality of outwardly bowed springs secured to said collar means and adapted to bear against the wall of the well to center the pipe therein, mud scraping blades attached to said springs and extending laterally therefrom to contact the wall of the well to scrape mud therefrom during movement of the pipe in the well, and spirally extending vane means projecting externally from said collar means for flowing cement slurry around the pipe as it rises past said vane means, whereby the combined action of the centering springs and said spirally extending vane means cooperate to produce an unchannelled cement plug extending all around the pipe with the pipe approximately centered therein.

3. Well mechanism for pipe to be cemented in a well, said mechanism comprising in combination, spaced collar means adapted to fit on and embrace the pipe, a plurality of outwardly bowed spirally twisted springs secured to said collar means and adapted to bear against the wall of the well to center the pipe therein and to present a spirally directed mud scraping edge to scrape mud from the wall of the well, and spirally extending vane means projecting externally from said collar means for flowing cement slurry around the pipe as it rises past said vane means, whereby the combined action of the centering springs and said spirally extending vane means cooperate to produce an unchanneled cement plug extending all around the pipe, with the pipe approximately centered therein.

ROBERT ALEXANDER STEPS.